United States Patent
Golan et al.

(10) Patent No.: US 8,752,023 B2
(45) Date of Patent: *Jun. 10, 2014

(54) SYSTEM, METHOD AND PROGRAM PRODUCT FOR EXECUTING A DEBUGGER

(75) Inventors: Nir Golan, Kibbutz Geva (IL); Aviad Zlotnick, Mitzpeh Netofah, D.N.G.T. (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/571,236

(22) Filed: Aug. 9, 2012

(65) Prior Publication Data

US 2012/0304155 A1    Nov. 29, 2012

Related U.S. Application Data

(63) Continuation of application No. 11/971,776, filed on Jan. 9, 2008, now Pat. No. 8,291,388.

(51) Int. Cl.
*G06F 9/44* (2006.01)

(52) U.S. Cl.
USPC ........................... 717/129; 717/124; 717/127

(58) Field of Classification Search
USPC .................................. 717/124–130, 136–140
See application file for complete search history.

(56) References Cited

U.S. PATENT DOCUMENTS

| | | | |
|---|---|---|---|
| 4,989,132 A * | 1/1991 | Mellender et al. ............ 717/139 |
| 5,124,989 A | 6/1992 | Padawer et al. | |
| 5,170,464 A | 12/1992 | Hayes et al. | |
| 5,524,244 A | 6/1996 | Robinson et al. | |
| 5,812,850 A | 9/1998 | Wimble | |
| 6,202,199 B1 | 3/2001 | Wygodny et al. | |
| 6,240,545 B1 * | 5/2001 | Carmichael et al. .......... 717/128 |
| 6,263,491 B1 | 7/2001 | Hunt | |
| 6,282,701 B1 | 8/2001 | Wygodny et al. | |
| 6,434,741 B1 | 8/2002 | Mirani et al. | |
| 6,438,713 B1 | 8/2002 | Taira et al. | |
| 6,681,384 B1 | 1/2004 | Bates et al. | |
| 6,701,514 B1 | 3/2004 | Haswell et al. | |
| 6,836,884 B1 * | 12/2004 | Evans et al. .................... 717/140 |
| 6,839,893 B2 * | 1/2005 | Bates et al. .................... 717/124 |
| 6,895,577 B1 | 5/2005 | Noble et al. | |
| 7,000,225 B2 * | 2/2006 | Sangavarapu et al. ........ 717/129 |
| 7,055,136 B2 * | 5/2006 | Dzoba et al. .................. 717/125 |
| 7,058,928 B2 | 6/2006 | Wygodny et al. | |
| 7,191,433 B2 * | 3/2007 | Narad et al. .................. 717/140 |
| 7,225,431 B2 | 5/2007 | Gschwind et al. | |
| 7,774,757 B1 * | 8/2010 | Awasthi et al. ............... 717/127 |
| 7,865,704 B2 | 1/2011 | Moyer | |
| 7,930,684 B2 * | 4/2011 | Roeck et al. .................. 717/129 |

(Continued)

OTHER PUBLICATIONS

Yin et al, "A Pointcut Language for Setting Advanced Breakpoints", ACM, pp. 145-156, 2013.*

(Continued)

*Primary Examiner* — Anil Khatri
(74) *Attorney, Agent, or Firm* — Zilka-Kotab, PC

(57) ABSTRACT

A method for controlling a debugger, the method includes: determining whether to execute a certain breakpoint of the debugger in view of certain breakpoint conditional information and in view of at least one previous visit, during the execution of the debugger, to at least one other breakpoint of the debugger; and selectively executing the certain breakpoint in response to the determination.

16 Claims, 2 Drawing Sheets

(56) References Cited

U.S. PATENT DOCUMENTS

| | | | |
|---|---|---|---|
| 7,930,689 B2 | 4/2011 | Cabillic et al. | |
| 7,934,204 B2* | 4/2011 | Brown et al. | 717/137 |
| 8,024,708 B2* | 9/2011 | Demetriou et al. | 717/124 |
| 8,087,002 B2 | 12/2011 | Fjeldstad et al. | |
| 8,091,075 B2 | 1/2012 | Bates et al. | |
| 8,117,600 B1* | 2/2012 | Roeck et al. | 717/128 |
| 8,136,097 B2* | 3/2012 | Konishi et al. | 717/129 |
| 8,286,142 B2* | 10/2012 | Fjeldstad et al. | 717/129 |
| 8,291,388 B2 | 10/2012 | Golan et al. | |
| 8,312,434 B2* | 11/2012 | Bates et al. | 717/128 |
| 8,429,617 B2* | 4/2013 | Demetriou et al. | 717/124 |
| 8,495,590 B2* | 7/2013 | Bates | 717/129 |
| 8,543,985 B2* | 9/2013 | Kahlon | 717/126 |
| 8,555,256 B2* | 10/2013 | Liu et al. | 717/129 |
| 8,561,028 B1* | 10/2013 | Zuckerman | 717/125 |
| 8,578,340 B1* | 11/2013 | Daudel et al. | 717/129 |
| 2005/0172272 A1 | 8/2005 | Bates et al. | |
| 2006/0200482 A1 | 9/2006 | Tan | |
| 2008/0276226 A1 | 11/2008 | Farchi et al. | |
| 2009/0178030 A1 | 7/2009 | Golan et al. | |

OTHER PUBLICATIONS

Chern et al, "Debugging with Controlflow Breakpoints", ACM, pp. 96-106, 2007.*

Zhang et al, "BPGen: An Automated Breakpoint Generator for Debugging", ACM, pp. 271-274, 2010.*

Grust et al, "DataIntensive XQuery Debugging with Instant Replay", ACM, pp. 1-6, 2007.*

Non-Final Office Action Summary from U.S. Appl. No. 11/971,776 mailed Aug. 2, 2011.

Non-Final Office Action Summary from U.S. Appl. No. 11/971,776 mailed Dec. 14, 2011.

Notice of Allowance and Fee(s) Due from U.S. Appl. No. 11/971,776 mailed Jun. 8, 2012.

Kim et al., "A History-Based Test Prioritization Technique for Regression Testing in Resource Constrained Environments," Proceedings—International Conference on Software Engineering 2002, pp. 119-129.

St. King et al., "Debugging Operating Systems With Time-Traveling Virtual Machines," Proceedings of the General Track 2005 USENIX Annual Technical Conference, 2005, pp. 1-15.

Ma et al., "Test-Suite Reduction Using Genetic Algorithm," Lecture Notes in Computer Science (including subseries Lecture Notes in Artificial Intelligence and Lecture Notes in Bioinformatics), v. 3756 LCNS, Advanced parallel Processing Technologies—6th International Workshop, APPT 2005, Proceedings, 2005, pp. 253-262.

Kang et al., "Debugging of assembly library functions without target debugging tools," IEEE, pp. 1-8, 2008.

Grust et al., "Data-Intensive Xquery Debugging with instant replay," ACM XIME-P, pp. 1-6, 2007.

Zhang et al., "BPGen: An automated breakpoint generator for debugging," ACM ICSE, pp. 271-274, 2010.

Chern et al., "Debugging with control flow breakpoints," ACM AOSD, pp. 96-106, 2007.

* cited by examiner

SYSTEM, METHOD AND PROGRAM PRODUCT FOR EXECUTING A DEBUGGER

RELATED APPLICATIONS

The present application is a continuation of U.S. Pat. application Ser. No. 11/971,776 filed on Jan. 9, 2008, which is incorporated herein by reference.

FIELD OF THE INVENTION

The present invention relates to a method, a system, and a program product for controlling a debugger.

BACKGROUND OF THE INVENTION

An important aspect of the design and development of a computer program is debugging, which is intended to locate and identify errors in a program under development. Typically, a programmer uses another program commonly known as a "debugger" to debug a program under development. A user may debug different programs or may repetitively debug the same program during multiple debugger sessions. The debugger is controlled by reading commands from a debugger script or by receiving debugger instructions from the user.

Conventional debuggers typically support two primary operations to assist a programmer. A first operation supported by conventional debuggers is a step function which permits a programmer to process program lines also referred to as instructions or statements), one at a time in a program and see the results of each instruction upon completion. A second operation supported by conventional debuggers is the breakpoint operation which permits a programmer to define a breakpoint as a precise instruction (identified by an instruction line number) at which execution of a program can be (conditionally or unconditionally) halted.

The evaluation of a program and especially the recreation of program faults (also known as "defects") can require that a predefined program execution path is followed. In many cases the predefined execution path requires that certain values are assigned to various data entities (such as but not limited to variables). In order to guarantee that the program is executed according to the predefined execution path multiple manual debugger sessions can be executed. During a manual debugger session the program and an associated debugger are executed to provide debugger session results. The debugger session results are manually analyzed by a user. The analysis of the debugger session can lead to an alteration of data entities that are utilized during the debugger session.

Various evaluation tests an action to be taken at a certain breakpoint only if that breakpoint was reached after another breakpoint, or combination of other breakpoints. Keeping track of the history of reached breakpoints is, today, a tedious manual chore.

There is a need to provide efficient methods for evaluating programs.

SUMMARY OF THE PRESENT INVENTION

According to one embodiment, a method for controlling a debugger includes determining whether to execute a certain breakpoint of the debugger in view of certain breakpoint conditional information and in view of at least one previous visit, during the execution of the debugger, to at least one other breakpoint of the debugger using a processor of a system. The method also includes selectively executing the certain breakpoint in response to the determination.

According to another embodiment, a program product includes a non-transitory computer usable medium that includes a computer readable program. The computer readable program when executed on a computer causes the computer to: determine whether to execute a certain breakpoint of a debugger in view of certain breakpoint conditional information and in view of at least one previous visit, during the execution of the debugger, to at least one other breakpoint of the debugger, and execute the certain breakpoint in response to the determination.

Other aspects and embodiments of the present invention will become apparent from the following detailed description, which, when taken in conjunction with the drawings, illustrate by way of example the principles of the invention.

BRIEF DESCRIPTION OF THE DRAWINGS

The present invention will be understood and appreciated more fully from the following detailed description taken in conjunction with the drawings in which.

DETAILED DESCRIPTION OF THE EMBODIMENT

According to one general embodiment of the invention, a debugger can condition an execution of a certain breakpoint by one or more previous visits to one or more breakpoints of the debugger. These one or more visits define a predefined execution path whose completion can trigger an execution of a breakpoint.

While a program is executed a history of visits to breakpoints of a debugger script, associated with the program, is maintained. An execution of a certain breakpoint can be conditioned upon that history. Tracking these visits is simplified by associating breakpoint identification information to the breakpoints, or at least to breakpoints whose visit can affect an execution of a breakpoint.

Figure 1:
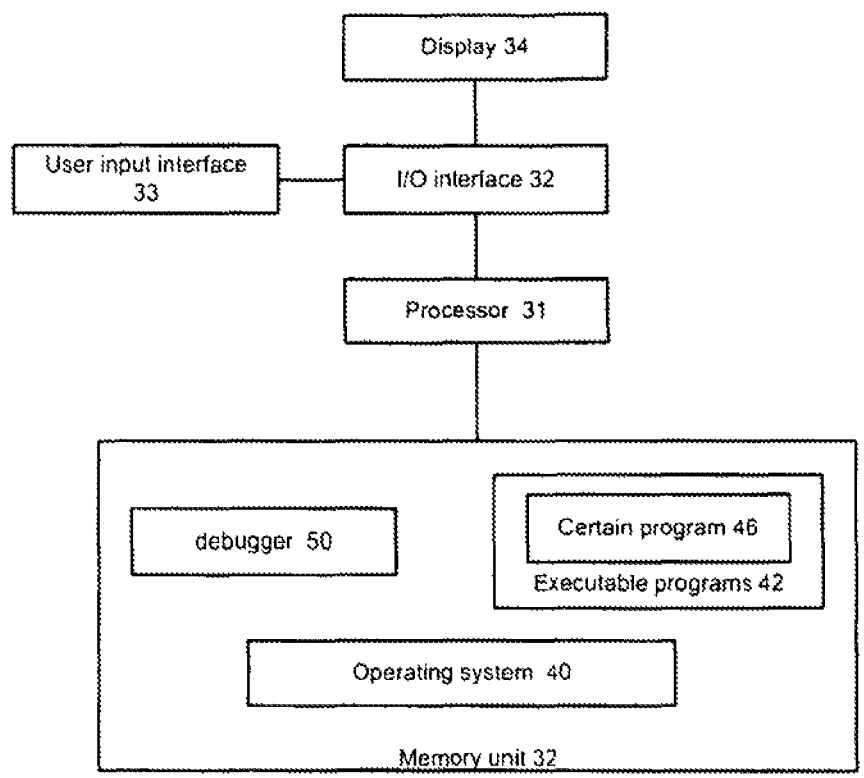
FIG. 1 illustrates a system having debugger execution capabilities, according to an embodiment of the invention.

FIG. 1 illustrates a system 10 having debugger execution capabilities, according to an embodiment of the invention. System 10 is intended to represent any type of computer system capable of carrying out the teachings of the invention. For example, system 10 could be a desktop computer, a laptop computer, a workstation, a hand held device, a client, a server, a programmable electronic device, and the like. System 10 may be connected in a network or may be a stand-alone system.

System 10 includes processor 31 that is connected to memory unit 32 and to I/O interface 32. I/O interface 32 is connected to user input interface 33 and to display 34. It is noted that display 34 can operate as a user input interface. For example, if display 34 is a touch screen.

System 10 can be connected to other devices via wired and/or wireless links. It is noted that system 10 can be characterized by a centralized architecture but that it can also be characterized by a distributed architecture. Accordingly, the various components of system 10 may or may not be located near each other.

Processor 31 may include a single processing unit, or be distributed across one or more processing units in one or more locations, e.g., on a client and server. Memory unit 32 may include any known type of data storage and/or transmission media, including magnetic media, optical media, random access memory (RAM), read-only memory (ROM), a data cache, a data object, etc. Moreover, similar to processor 31, memory unit 32 may reside at a single physical location, including one or more types of data storage, or be distributed across a plurality of physical systems in various forms.

System 10 may also be connected to, or include, a handheld device, speech output system, printer, facsimile, pager, and the like.

It is noted that system 10 can be connected to a storage unit (not shown) or even be included within a storage system. The storage system can be any system (e.g., a database, etc.) capable of providing storage for information under the present invention. Although not shown, additional components, such as communication systems, system software, etc., may be incorporated into system 10.

It should be appreciated that the teachings of the invention could be implemented on a stand alone system 10 as shown, or over a network, which can be any type of network such as the Internet, a local area network (LAN), wide area network (WAN), a virtual private network (VPN). etc. In the case of the latter, communication throughout the network could occur via a direct hardwired connection (e.g., serial port), or via an addressable connection that may utilize any combination of wireline and/or wireless transmission methods. Conventional network connectivity, such as Token Ring, Ethernet, WiFi or other conventional communications standards could be used. Still yet, connectivity could he provided by conventional IP-based protocol. In this instance, an Internet service provider could be used to establish interconnectivity.

It should also be appreciated that the debugger program can be resident locally on system 10, or imported for use via a network.

User input interface 33 can be a keyboard, mouse, a joystick, a touchpad, a microphone, a gesture recognition device, or a combination thereof. It is noted that some of the mentioned above components such as user input interface 33 and display 34 are optional, especially when system 10 should not be directly accessed by the user. For example, a host computer that is placed in a remote location does not necessarily include display 34.

According to an embodiment of the invention, system 10 operates under the control of operating system 40, and executes various computer software applications, components, programs, objects, modules, etc., such as but not limited to executable programs 42 and debugger 50, also known as debugger software application.

The system 10 can be controlled by multiple operating systems that in turn are monitored by a hypervisor. For simplicity of explanation figure illustrates a single operating system.

For simplicity of explanation it is assumed that debugger 50 is used to debug a certain program, such as 46, out of executable programs 42.

Memory unit 32 can store debugger and processor 31 can be adapted to execute debugger 50, can execute any stage of methods 100 (of FIG. 2) and/or method 200 (of FIG. 4).

Processor 31 is adapted to determine whether to execute a certain breakpoint of the debugger in view of certain breakpoint conditional information and in view of at least one previous visit, during the execution of the debugger to at least one other breakpoint of the debugger. This certain breakpoint can be any breakpoint of debugger that is associated with breakpoint conditional information.

Processor 31 is also adapted to selectively execute the certain breakpoint in response to the determination. Thus, processor 31 can execute a currently visited breakpoint only if a predefined execution path was followed.

Processor 31 is adapted to associate breakpoint identification information to breakpoints of the debugger, and additionally or alternatively, receive breakpoint identification information to breakpoints. The breakpoint conditional information is arranged as breakpoint conditional attribute, but this is not necessarily so.

Memory unit 32 is adapted to store one or more breakpoint conditional attributes that condition an execution of one or more breakpoints by at least one pervious visit, during the execution of the debugger, to the at least one other breakpoint.

Processor 31 is adapted to determine whether to execute a certain breakpoint of the debugger in response to a certain breakpoint conditional attribute that is debugger primitive. Processor 31 is adapted to define a certain breakpoint conditional attribute that conditions an execution of the certain breakpoint by at least one pervious visit, during the execution of the debugger, to at least one other breakpoint of the debugger.

Processor 31 is adapted to determine whether to execute a certain breakpoint of the debugger in response to at least one previous visit to the certain breakpoint as in response to at least one previous visit to another breakpoint.

Processor 31 is adapted to generate breakpoint visit indicators that include breakpoint identification information and number of visits information. The number of visits indication indicate how many time a breakpoint was visited.

The history of visits is limited either by limiting the number of visits and/or by limiting the number of breakpoints. This limitation can be represented by limiting the memory space (size of stack) allocated for the history, and the like.

The following sample debugger lines will illustrate breakpoint conditional information as well as breakpoint identification information:

(1) Switch (x) {// break here and set x to Error if breakpoint Finish was visited;
(2) case Process:
(3) f1 ( );
(4) break;
(5) case Finish;
(6) f2 ( ); // breakpoint Finish
(7) break;
(8) case Error:
(9) f3 ( );
(10) break;
(11) }

Line 1 includes conditional breakpoint information ("break here and set x to Error if breakpoint Finish was visited") that instructs the debugger to execute a breakpoint during which variable x is set to Error if another breakpoint (breakpoint Finish of line 6) was previously visited. Line 6 includes breakpoint identification information ("breakpoint Finish") that identifies breakpoint Finish.

Figure 2:
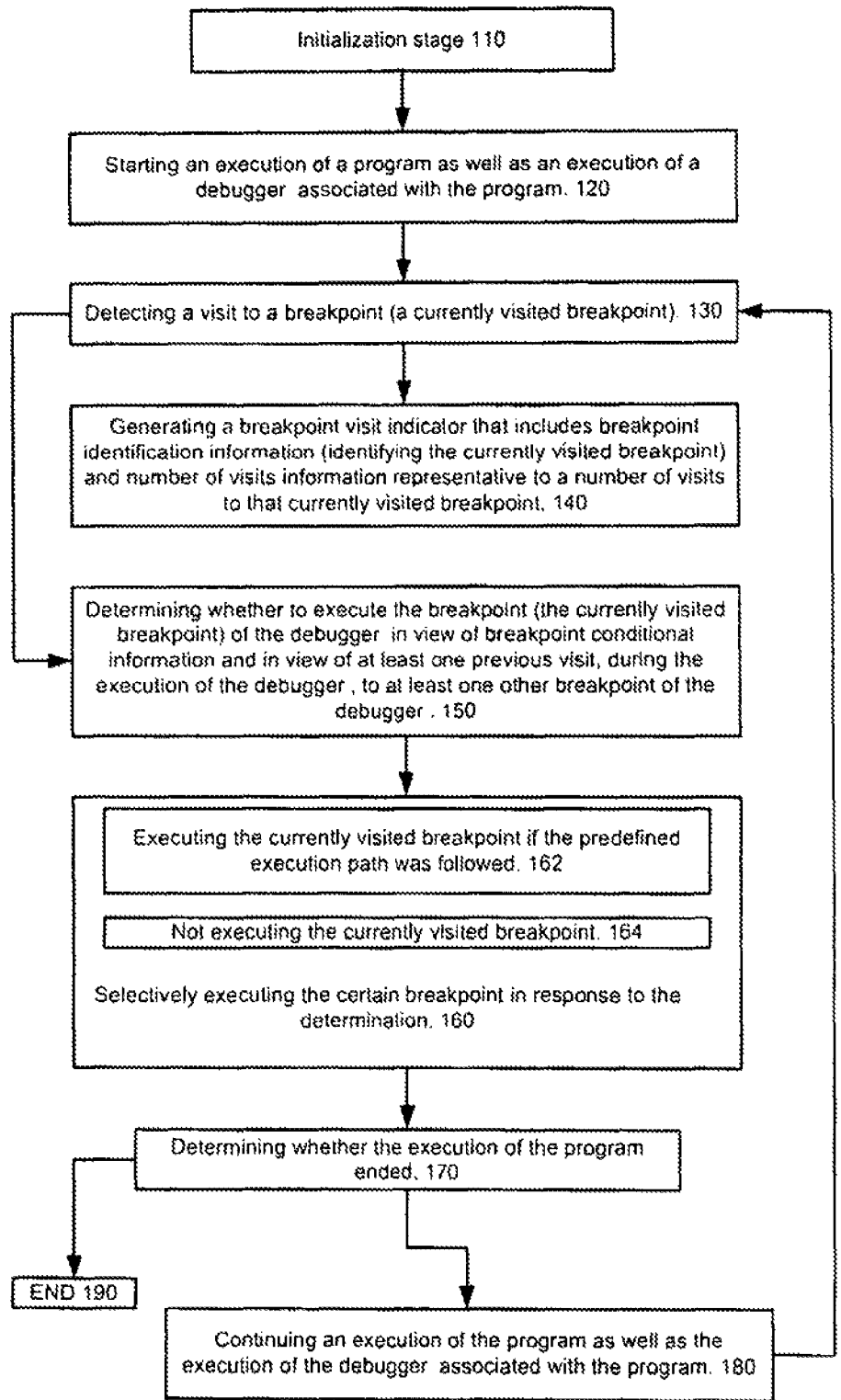
FIG. 2 is a flow chart of a method for executing a debugger, according to another embodiment of the invention.

FIG. 2 is a flow chart of method 100 for controlling a debugger, according to an embodiment of the invention.

Method 100 starts by initialization stage 110. initialization stage 110 can include at least one of the following operations or a combination thereof: (i) associating a debugger program with code that is to be inspected; (ii) defining breakpoints in the code to be inspected; (iii) associating breakpoint identification information to breakpoints of the debugger;. (iv) receiving breakpoint identification information associated with breakpoints of the debugger (v) receiving certain breakpoint conditional information that conditions an execution of a certain breakpoint by at least one pervious visit, during the execution of the debugger, to the at least one other breakpoint; (vi) receiving a certain breakpoint conditional attribute that conditions an execution of the certain breakpoint by at least one pervious visit, during the execution of the debugger, to the at least one other breakpoint; (vii) defining a certain breakpoint conditional attribute that conditions an execution of the certain breakpoint by at least one pervious visit, during the execution of the debugger, to the at least one other breakpoint; and (viii) associating debugger commands with breakpoints.

It is noted that the certain debugger attributes can define a predefined execution path that once followed can trigger an execution of the certain breakpoint. This predefined execution path can include a predefined number of visits per predefined breakpoints. It is noted that different breakpoints can be associated with different predefined execution paths. It is noted that a single debugger usually includes multiple breakpoints and at least one or more of these breakpoints can be associated with its own breakpoint conditional information.

The predefined execution path can include a predefined number of visits to breakpoint that differ from the currently visited breakpoint but may also include one or more visits to the currently visited breakpoint (in addition to one or more visits to other breakpoints).

It is noted that the amount of breakpoints (and/or number of visits) that be included in the predefined execution path can be limited. The limitation can result from memory space allocation constraints, from speed of execution constraints and the like. Accordingly, if one or more limitation are enforced then method 100 can be viewed as including a stage of limiting a number of visits that can affect the determining to a predefined number, and/or a stage of limiting a number of breakpoints that once visited affect the determining.

Stage 110 is followed by stage 120 of starting an execution of a program as well as an execution of a debugger associated with the program. Stage 120 is followed by stage 130 of detecting a visit to a breakpoint. This breakpoint is referred to as a currently visited breakpoint.

Stage 130 is followed by stages 140 and 150. Stage 140 includes generating a breakpoint visit indicator that includes breakpoint identification information (identifying the currently visited breakpoint) and conveniently also includes a number of visits information representative to a number of visits to that currently visited breakpoint. This number is reset once the debugger execution ends.

Stage 150 includes determining whether to execute the breakpoint (also referred to as a currently visited breakpoint or a certain breakpoint) of the debugger in view of breakpoint conditional information associated with this breakpoint and in view of at least one previous visit, during the execution of the debugger, to at least one other breakpoint of the debugger. Thus, if the execution of the debugger covered the predefined execution path then the currently visited breakpoint should be executed, else it is not executed.

Stages 150 is followed by stage 160 of selectively executing the certain breakpoint in response to the determination. Stage 160 includes stages 162 and 164. Stage 162 includes executing the currently visited breakpoint if the predefined execution path was followed. Stage 164 includes not executing the currently visited breakpoint.

Stage 160 is followed by stage 170 of determining whether the execution of the program ended. If the answer is negative then stage 170 is followed by stage 180 of continuing an execution of the program as well as the execution of the debugger associated with the program. Stage 180 is followed by stage 130. If the answer is positive then stage 170 can be followed by stage 190 of ending method 100. Stage 190 can include sending one or more results of the debugger execution to a user, storing one or more result, processing the results to provide processed results and the like.

Furthermore, the invention can take the form of a program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device, The medium can be an electronic, magnetic, optical, electromagnetic, infrared, or semiconductor system (or apparatus or device) or a propagation medium, Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk read/write CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A program product is provided. The program product includes a computer readable program, wherein the computer readable program when executed on a computer causes the computer to determine whether to execute a certain breakpoint of the debugger in view of at least one previous visit, during the execution of the debugger, to ac least one other breakpoint of the debugger; and execute the certain breakpoint in response to the determination.

The computer readable program when executed on a computer causes the computer to associate breakpoint identification information to breakpoints of the debugger. The computer readable program when executed on a computer causes the computer to determine whether to execute a certain breakpoint of the debugger in view of a certain breakpoint conditional attribute that is a debugger primitive. The computer readable program when executed on a computer causes the computer to define a certain breakpoint conditional attribute that conditions an execution of the certain breakpoint by at least one pervious visit, during the execution of the debugger, to the at least one other breakpoint.

The computer readable program when executed on a computer causes the computer to determine whether to execute a certain breakpoint of the debugger in view of at least one previous visit to the certain breakpoint. The computer readable program when executed on a computer causes the computer to generate breakpoint visit indicators that comprise breakpoint identification information and number of visits information.

The computer readable program when executed on a computer causes the computer to limit a number of visits that can affect the determining to a predefined number.

The computer readable program when executed on a computer causes the computer to limit a number of breakpoints that once visited affect the determining.

The computer readable program when executed on a computer causes the computer to: determine whether to execute a certain breakpoint of the debugger in view of at least one previous visit, during the execution of the debugger, to at least one other breakpoint of the debugger: and execute the certain breakpoint in response to the determination.

Variations modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A method for controlling a debugger, the method comprising:
    using a processor of a system to associate breakpoint identification information to breakpoints of a debugger;
    determining whether to execute a certain breakpoint of the debugger in view of certain breakpoint conditional information and in view of at least one previous visit, during the execution of the debugger, to at least one other breakpoint of the debugger using the processor of the system; and
    selectively executing the certain breakpoint in response to the determination.

2. The method according to claim 1 wherein the determining is preceded by receiving a certain breakpoint conditional attribute that conditions an execution of the certain breakpoint by at least one previous visit, during the execution of the debugger, to the at least one other breakpoint.

3. The method according to claim 1 wherein the determining is responsive to a certain breakpoint conditional attribute that is a debugger primitive.

4. The method according to claim 1 wherein the determining is preceded by defining a certain breakpoint conditional attribute that conditions an execution of the certain breakpoint by at least one previous visit, during the execution of the debugger, to the at least one other breakpoint.

5. The method according to claim 1 wherein the determining is further responsive to at least one previous visit to the certain breakpoint.

6. The method according to claim 1 further comprising generating breakpoint visit indicators that comprise breakpoint identification information and number of visits information.

7. The method according to claim 1 further comprising limiting a number of visits that can affect the determining to a predefined number.

8. The method according to claim 1 further comprising limiting a number of breakpoints that once visited affect the determining.

9. A program product comprising a non-transitory computer usable medium including a computer readable program, wherein the computer readable program when executed on a computer causes the computer to:
    determine whether to execute a certain breakpoint of a debugger in view of certain breakpoint conditional information and in view of at least one previous visit, during the execution of the debugger, to at least one other breakpoint of the debugger; and
    execute the certain breakpoint in response to the determination, wherein the computer readable program when executed on a computer causes the computer to associate breakpoint identification information to breakpoints of the debugger.

10. The program product according to claim 9, wherein the computer readable program when executed on a computer causes the computer to determine whether to execute a certain breakpoint of the debugger in view of a certain breakpoint conditional attribute that is a debugger primitive.

11. The program product according to claim 9, wherein the computer readable program when executed on a computer causes the computer to receive a certain breakpoint conditional attribute that conditions an execution of the certain breakpoint by at least one previous visit, during the execution of the debugger, to the at least one other breakpoint.

12. The program product according to claim 9, wherein the computer readable program when executed on a computer causes the computer to define a certain breakpoint conditional attribute that conditions an execution of the certain breakpoint by at least one previous visit, during the execution of the debugger, to the at least one other breakpoint.

13. The program product according to claim 9, wherein the computer readable program when executed on a computer causes the computer to determine whether to execute a certain breakpoint of the debugger in view of at least one previous visit to the certain breakpoint.

14. The program product according to claim 9, wherein the computer readable program when executed on a computer causes the computer to generate breakpoint visit indicators that comprise breakpoint identification information and number of visits information.

15. The program product according to claim 9, wherein the computer readable program when executed on a computer causes the computer to limit a number of visits that can affect the determining to a predefined number.

16. The program product according to claim 9, wherein the computer readable program when executed on a computer causes the computer to limit a number of breakpoints that once visited affect the determining.

* * * * *